United States Patent [19]
Jiles

[11] Patent Number: 5,358,010
[45] Date of Patent: Oct. 25, 1994

[54] DUAL PURPOSE PIPE STOPPER MECHANISM

[76] Inventor: Stephen L. Jiles, 1513 Dogwood Ave., Anaheim, Calif. 92801

[21] Appl. No.: 709,095

[22] Filed: May 30, 1991

[51] Int. Cl.$^5$ .......................................... F16L 55/105
[52] U.S. Cl. ........................................ 138/94; 138/90
[58] Field of Search ................ 4/255, 295; 137/317, 137/318; 138/89, 90, 94, 97, 93; 220/235

[56] References Cited

U.S. PATENT DOCUMENTS

| | | | |
|---|---|---|---|
| 2,171,937 | 9/1937 | Larry et al. | 137/78 |
| 2,171,942 | 7/1937 | Mueller | 137/78 |
| 2,237,476 | 9/1937 | Cline | 251/56 |
| 2,272,734 | 2/1942 | Witt | 138/94 |
| 2,306,452 | 5/1942 | Lopez | 138/89 |
| 2,310,351 | 2/1943 | Bowan | 138/89 |
| 2,390,461 | 12/1945 | Racz | 138/89 |
| 2,482,687 | 9/1949 | Mueller | 138/89 |
| 2,533,715 | 12/1950 | Conklin | 220/235 |
| 2,655,339 | 10/1955 | Smith | 251/68 |
| 2,740,606 | 10/1956 | Koenig | 251/175 |
| 2,756,486 | 4/1956 | Smith | 29/157 |
| 2,763,282 | 9/1956 | Reedy | 138/94 |
| 2,899,983 | 3/1958 | Farris | 138/97 |
| 2,913,012 | 11/1959 | McCurley | 138/94 |
| 2,977,992 | 4/1961 | Jensen | 138/89 |
| 3,115,163 | 12/1963 | Van Epps et al. | 138/94 |
| 3,120,246 | 2/1964 | Alter | 138/94 |
| 3,156,373 | 11/1964 | Willis | 138/89 |
| 3,302,661 | 2/1967 | Williams | 138/89 |
| 3,409,035 | 11/1968 | Miller | 137/242 |
| 3,669,139 | 6/1972 | Gajdos | 137/317 |
| 3,688,798 | 9/1972 | Nightingale et al. | 137/625.47 |
| 3,799,182 | 3/1974 | Long | 137/15 |
| 3,836,035 | 9/1974 | Simbordi | 220/235 |
| 3,889,714 | 6/1975 | Walger | 138/89 |
| 3,948,282 | 4/1976 | Yano | 137/15 |
| 3,993,103 | 11/1976 | Hammer | 138/89 |
| 4,019,541 | 4/1977 | Koppl | 139/94 |
| 4,127,141 | 11/1978 | Ledonne et al. | 137/15 |
| 4,369,813 | 1/1983 | Thomas | 138/94 |
| 4,503,879 | 3/1985 | Lazarus | 137/315 |
| 4,793,056 | 12/1988 | Kurokawa | 138/89 |
| 4,880,028 | 11/1989 | Osburn | 138/94 |
| 4,883,085 | 11/1989 | Weller et al. | 137/315 |
| 4,982,763 | 1/1991 | Klahn | 138/90 |

Primary Examiner—David A. Scherbel
Assistant Examiner—Terrence R. Till
Attorney, Agent, or Firm—Christie, Parker & Hale

[57] ABSTRACT

A dual purpose stopper having a deformable, resilient body resides in a branch, communicating with a pipe through an opening in the wall of the pipe. The stopper has a distendable rear portion which can be expanded radially to seal the branch, allowing removal of a mechanism used to actuate the stopper. When actuated, the stopper is shifted by the mechanism from the branch into the pipe, deforming the stopper and sealing the pipe.

7 Claims, 10 Drawing Sheets

DUAL PURPOSE PIPE STOPPER MECHANISM

FIELD OF THE INVENTION

The present invention relates generally to gas pipes and, more particularly, to a pipe stopper which is capable both of stopping the flow of gas in a gas pipe and of blocking the escape of gas through a branch normally housing the stopper so as to allow removal of the stopper-actuating mechanism without the need for pressurizing equipment.

BACKGROUND OF THE INVENTION

There is described in applicant's patent application, Ser. No. 07/513,599, filed Apr. 24, 1990, entitled Pipeline Repair Method and Apparatus, which is incorporated herein in its entirety by this reference, an apparatus for boring a hole in the wall of a pressurized plastic gas pipe and inserting through the opening a stopper having a deformable, resilient skin so as to block the flow of gas in the pipe while the pipe is being repaired. An insertion assembly for inserting the stopper into the pipe is the subject of a divisional application of the above referenced application, Ser. No. 07/605,988, filed Oct. 29, 1990. As taught in the above referenced Patent Applications, the stopper is inserted into the pipe by means of a gate valve assembly which serves to provide a pressurized space for the insertion and removal of the stopper, thereby preventing the escape of gas from the pressurized pipe during the stopper insertion and removal operation. Thus, each time that the stopper is to be inserted into the pipe so as to block it, the gate valve assembly must be used along with the stopper insertion assembly, and the same is also true each time it is desired to withdraw the stopper from the gas pipe.

A gate valve, of necessity, is a relatively bulky piece of equipment, and it would be desirable if its use were not required each time a deformable stopper is to be inserted into or withdrawn from the gas pipe. Further, it would be desirable if apparatus which is used to actuate the stopper could be left in place with the stopper, but could be readily removed for inspection and repair or replacement at any time, without gas escaping from the pressurized gas pipe.

SUMMARY OF THE INVENTION

The present invention is directed to a dual purpose stopper for blocking either a gas pipe under pressure or a branch which extends from the pipe and which is in communication with the pipe through an opening in the wall of that pipe. In accordance with the invention, the dual purpose stopper includes a cylindrical, deformable, resilient body which is adapted normally to reside in the branch and to be shifted from the branch through the pipe wall opening into the pipe under an axial force and to be distended by that force so as to block the pipe. The deformable, resilient body has a rear region on opposite sides of which first and second members are disposed. Means are also provided for moving the members toward each other while the body is disposed in the branch so as to axially compress and radially distend the rear region of the body until it blocks the branch. Typically, the branch comprises a branching saddle bonded to the pipe and having a tubular pipe stub, and a tubular housing seated on that stub. The radially distended rear region of the body is located in and presses against the wall of the housing, while a region of the body extending forward from the rear region extends into the tubular pipe stub. This is the retracted position of the stopper in which it does not block the flow of gas in the pressurized pipe. When it is desired to block the flow of gas in the pipe, the stopper is shifted through the opening in the wall of the gas pipe into the pipe with sufficient force to cause the stopper body to deform until it conforms to the bore of the pipe, blocking it.

Means are provided in accordance with the invention to drive the stopper into the pipe. It is comprised of three concentric cylinders telescoped within each other. The first cylinder extends inside the tubular housing and is affixed thereto so as to provide a pressurized space in the housing. The second cylinder extends slidably inside the first cylinder and into driving engagement with the rear end of the stopper. The third cylinder is disposed inside the second cylinder and is threadably engaged therewith. The second cylinder is restrained against rotation within the first cylinder, and the third cylinder is restrained against axial movement relative to the first cylinder and is journaled for rotation therein. As a result, when the third cylinder is turned inside the first cylinder, the second cylinder is driven by the third cylinder inside the first cylinder axially toward or away from the pipe, advancing or retracting the stopper into or from the pipe. The third cylinder has a bore extending through its entire length through which a wrench may be inserted to actuate the members of the stopper body so as to expand or relax the rear region of that body so as to block or unblock the housing in which the stopper rear region normally resides. Because of the ability of the stopper to block the housing, the driving assembly may be readily removed from the housing for inspection, repair or replacement without the need for a gate valve assembly.

DETAILED DESCRIPTION

There will be next described the best mode contemplated by applicant for a stopper and a driving assembly therefor. They will be described in the context of a series of steps which will be normally followed for installing them in cooperative relationship with a gas pipe, while that pipe is under pressure.

Figure 1:
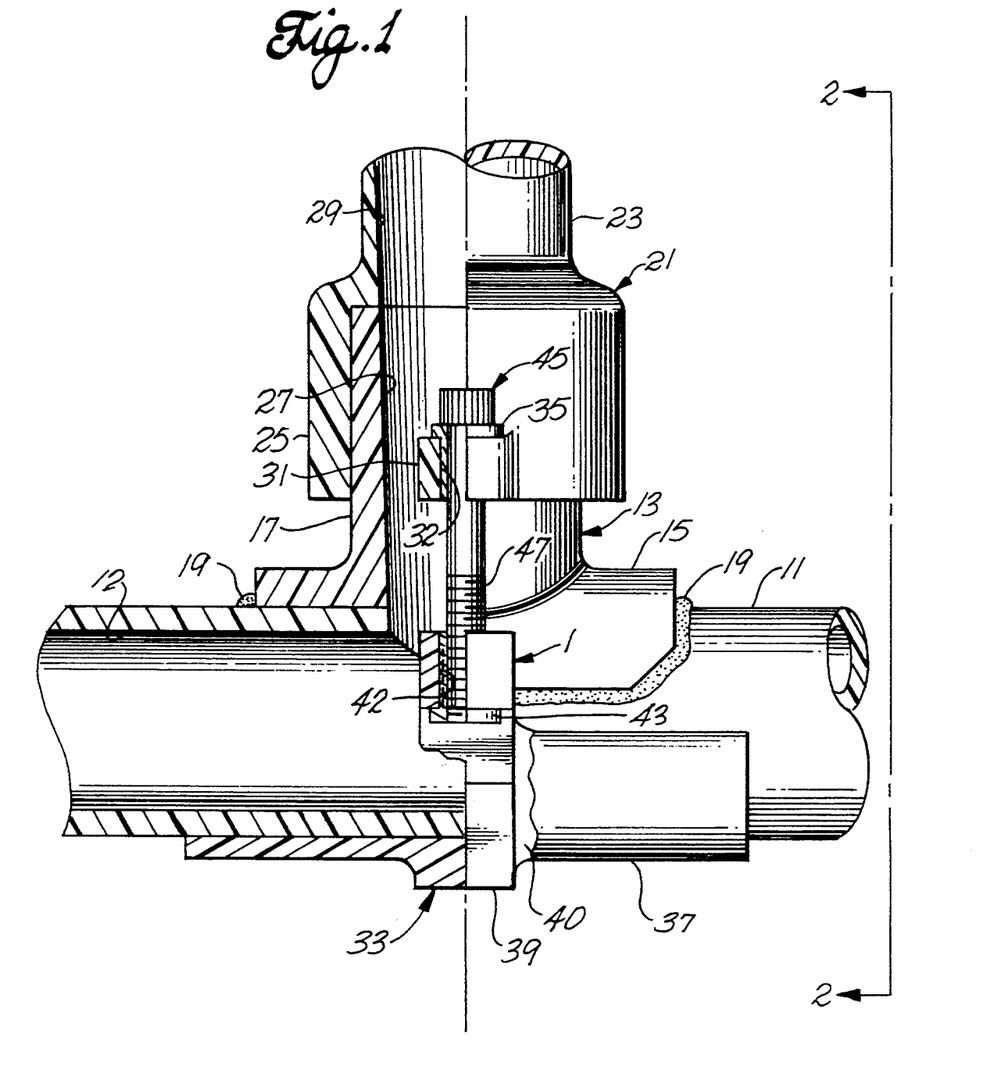
FIG. 1 is a side view, partially broken away, of a pipe with a branching saddle bonded thereon, a housing bonded to the branching saddle, and a cradle opposite the branching saddle bolted to the bottom of the housing.
Figure 2:
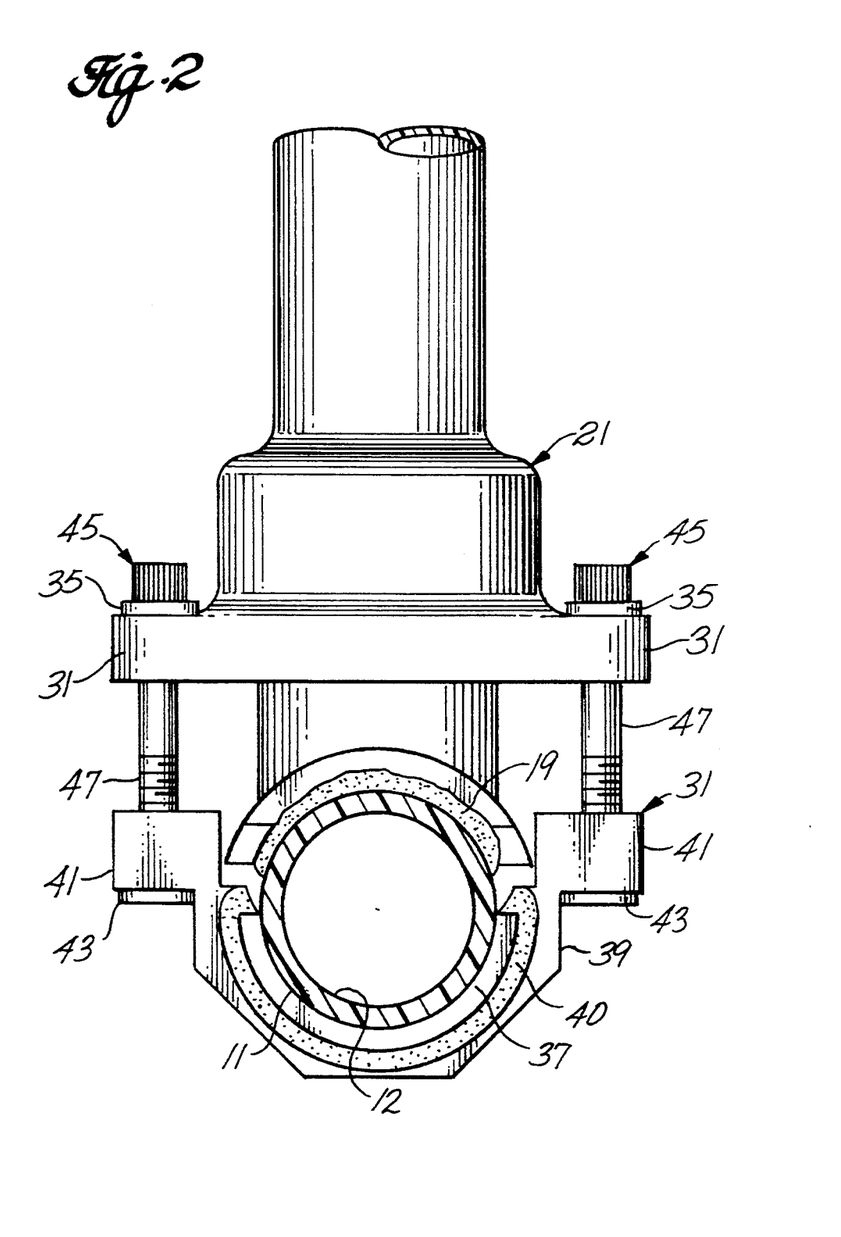
FIG. 2 is an end view, partially in cross-section, of the arrangement of FIG. 1, showing the housing, the cradle and the bolts fastening the two.

Referring first to FIGS. 1 and 2, there is shown a plastic gas pipe 11 and a branching saddle 13, mounted thereon. The branching saddle includes a saddle portion 15 and a pipe stub 17, extending therefrom. The branching saddle 13 may be attached to the pipe 11 in a conventional manner by bonding it, using a heating iron. The heating iron (not shown) is sandwiched between the pipe 11 and the saddle portion 15, melting each. It is then removed, and the saddle portion 15 is pressed against the pipe 11 until they bond, as reflected by the bead 19, shown around the periphery of the saddle portion 15. It is preferred that the branching saddle be of the same material as the pipe, typically PVC.

Extending from the pipe stub 17 is a housing 21, preferably of the same material as the branching saddle 13. It includes a tubular body terminating in a cuff 25 at its bottom end (as seen in FIGS. 1 and 2). The housing 21 may be attached to the pipe stub 17 in a manner similar to that in which the pipe stub is attached to the pipe 11. A heating iron (differently configured than that used to attach branching saddle 13 to the pipe 11, is used to melt the outside of the pipe stub 17 and the inside of the cuff 25). After those surfaces have melted, the heating iron is removed and the housing 21 is pushed onto the stub 17 until they bond. Thus, the pipe stub 17, having a bore 27, and the housing 21, having a bore 29, which blends with the bore 27, together comprise a branch which is adapted to communicate with the pipe 11 after a hole has been bored through the wall of the pipe in registry with the opening 27. Extending radially from the cuff 25 are bracket members 31 which serve to help secure the housing 21 on the pipe 11 in combination with a clamp member 33 disposed underneath the pipe (as viewed in FIG. 2). Each of the bracket members 31 has an opening 32, in which resides a metal insert 35. The clamp member 33 comprises a rigid cradle 37, which is girded around its mid-section by a band 39, terminating in a pair of bracket members 41. An opening 42 extends through each bracket member 41, and a metal insert 43 extends into and through each of those openings. A pair of threaded bolts 45 extend through the inserts 42 and 45, the latter of which are internally threaded for engagement with the threaded portion of the bolts 45. By tightening the bolts 45, the cradle 37 is clamped against the underside of the pipe 11, securely holding the housing 21 in place upon the pipe. Although the clamp member 33 could be fabricated of a single piece of metal, typically aluminum, it is shown in the form of which a prototype was constructed, wherein the band 39 is welded to the cradle 37, the weld marks being indicated at 40.

Figure 3:
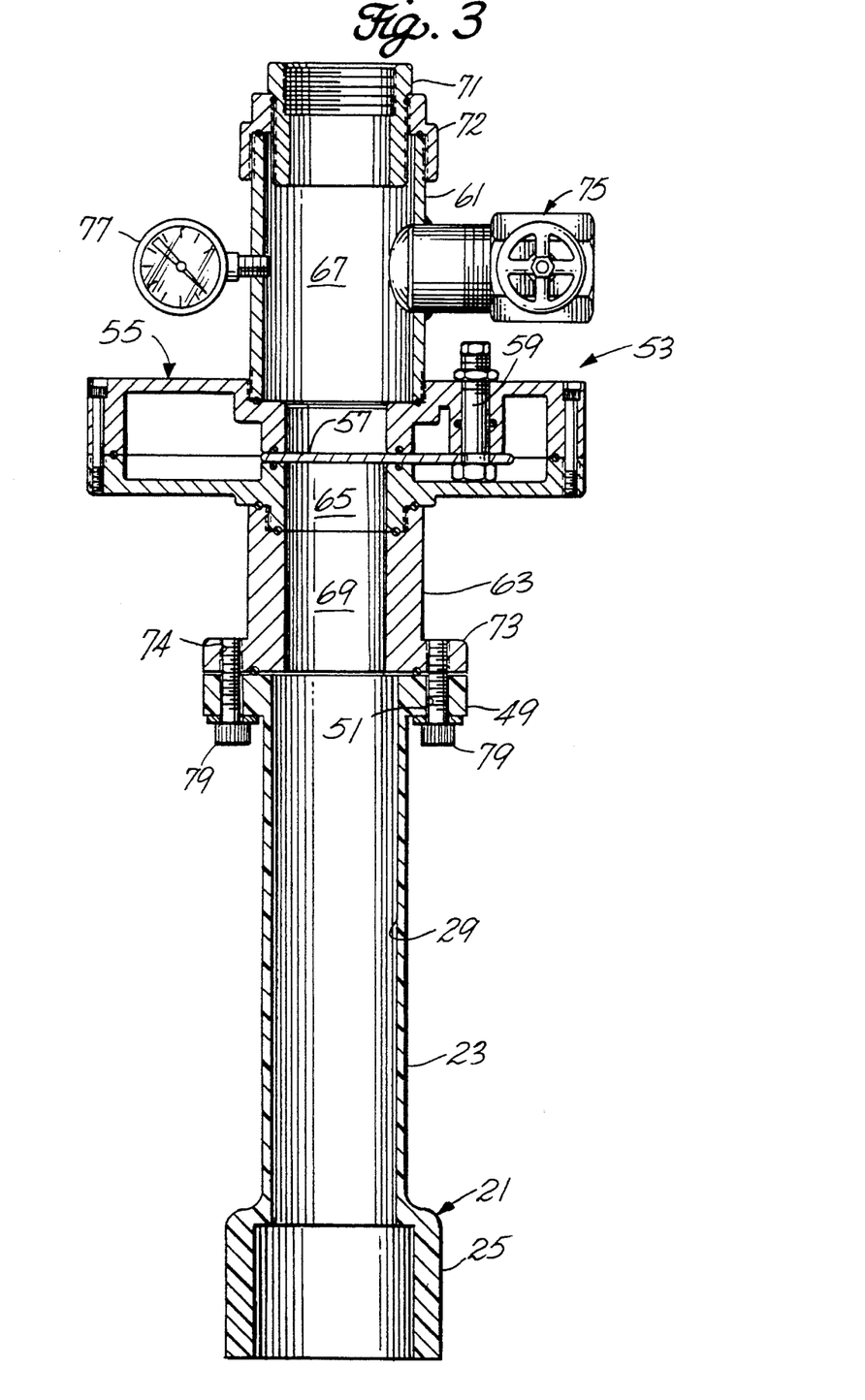
FIG. 3 illustrates the housing of FIGS. 1 and 2 and a gate valve assembly attached to the top of the housing to facilitate the insertion of instruments for cutting a hole in the wall of the pipe and for initially inserting a stopper into the housing.

The next step in the process of installing the stopper of the present invention is to bore a hole through the wall of the pipe 11 in registry with the pipe stub bore 27. This may be accomplished by use of a gate valve assembly, such as that described in detail in the first of the above referenced applications. Since the gate valve assembly is essentially like that disclosed in the referenced application, it will be described herein only to the extent necessary to understand its operation. The gate valve assembly 53, shown in FIG. 3, comprises a drum 55, containing a gate valve 57, mounted by means of a bolt 59 for being swung within the drum 55, between open and closed positions. A pair of tubular sections 61 and 63 extend in opposite directions from the drum 55, the drum having an interior axial passage 65, communicating with the axial passages 67 and 69 of the tubular sections 61 and 63, respectively, when the valve 57 is swung open. A tool receptacle 71 is mounted in the inlet of the section 61 by a coupling collar 72. The tool receptacle 71 is internally threaded at its inlet end to receive a cutter insertion assembly, as will be described. The second section 63 of the gate valve assembly 53 terminates in a flange 73 with threaded openings 74, distributed around its periphery. A matching flange 49, with matching openings 51, is provided at the upper end of the tubular section 23 of the housing 21, so that by a means of a set of bolts 79, the gate valve assembly 53 may be bolted to the end of the housing 21, as shown in FIG. 3. Located in the upper section 61 of the gate valve assembly 53, are a ball valve 75 and a gauge 77 for operating the gate valve in the manner described in detail in the first referenced patent application Ser. No. 07/513,599. Seals are provided between the various recited elements of the gate valve assembly 53 and between the gate valve assembly and the housing 21 to provide a gas-tight seal.

After the gate valve assembly 53 has been bolted in place on the housing 21, a hole is cut through the wall of the pipe 11 by means of a shell cutter in the manner described in detail in the above referenced patent application Ser. No. 07/513,599. Basically, a cutter carried at the end of an insertion assembly (not shown) is moved through the gate valve assembly 53 into engagement with the pipe 11. By appropriate manipulation of the valves 57 and 75, this is achieved without adversely affecting the flow of gas in the pipe 11. By means of the insertion assembly, the cutter is turned and a hole is cut through the wall of the pipe, resulting in an opening 80, seen in FIG. 8. After the cutting operation is complete, the cutter insertion assembly is removed through the gate valve assembly 53, leaving the gate valve assembly 53 in place with the valve 57 closed, providing a seal to prevent the escape of gas from the pipe 11.

Figure 4:
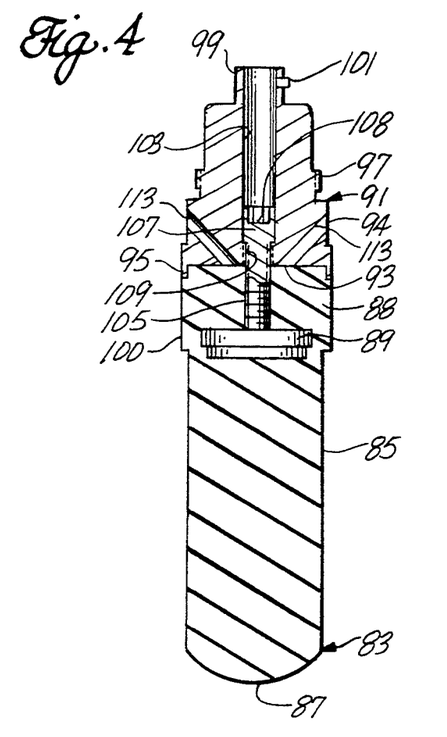
FIG. 4 is a cross-section through the stopper of the present invention in its relaxed condition.
Figure 5:
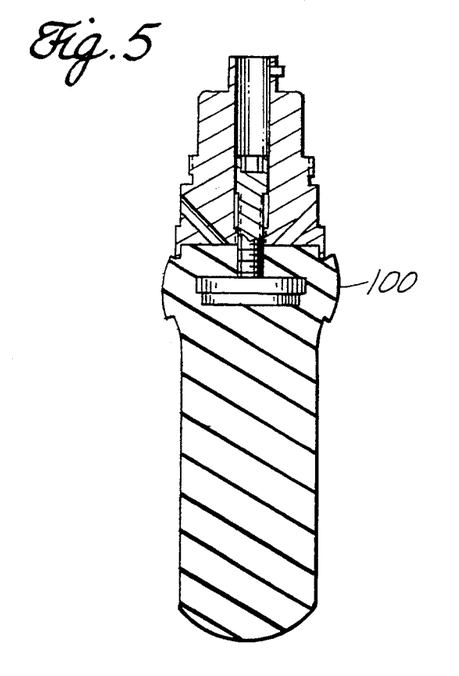
FIG. 5 is a cross-section of the stopper of FIG. 4, illustrating the distended rear end of the stopper body, resulting from the actuation of a clamping member in the rear region of that body.

The next step in the process is to install the stopper of the present invention in the housing 21 through the gate valve assembly 53. Before describing that step, the stopper itself will be described with reference to FIGS. 4 and 5. The stopper 81, illustrated in FIGS. 4 and 5, comprises a deformable, resilient body 83, having a cylindrical portion 85 terminating in a rounded distal end 87. The resilient stopper body 83 terminates in a rear portion 88, which is also cylindrical, but is slightly larger in diameter, having a peripheral surface 100, sized to fit within the bore 29 of the housing 21. A first clamping member, plate 89, is embedded in the rear region 88, and a second clamping member, hub 91, is located at the end of the region. The backing member 91 has a circular end face 93, surrounded by a peripheral stopper-retaining skirt 95. The backing member 91 terminates in a reduced, round end 99, from which there extends a retaining pin 101. A bore 103 extends through the reduced end 99 and through the base 94 of the backing member 91, where it communicates with a threaded opening 109, terminating in the surface 93. Located above the base 94 (as seen in FIG. 4), is a threaded rim 97, which, as will be seen, serves to retain the stopper 81 on its insertion tool during a subsequent operation. Anchored solidly in the first clamping member 89, is a bolt 105, having a head 107, with a hexagonal recess 108, for receiving a wrench, to be described.

The body 83 is preferably a molded elastomer. For this purpose, the backing member 91 may be used as part of a mold, the rest of which is not shown but which would be fabricated to define the shape of the body 83. A pair of viewing holes 113 extend diagonally through the hub 91 from its end face 93, so that excess material used in forming the body 83 may escape through them, indicating that the cavity in which the body 83 is being formed has been filled. By use of an appropriate bonding agent at the interface of the face 93 and the body 83, the latter may be caused to adhere to the former. In the absence of such a bonding agent, the plate 89 will not adhere to the material of the body 83, so that the plate is free to turn therein.

When the bolt 105 is turned, by means of a tool to be described next, the plate 89 turns with it, and, as the bolt travels axially within the hub 91, the plate 89 will travel with the bolt toward or away from the end face 93. As the bolt 105 is withdrawn into the body of the hub 91, the plate 89 squeezes the rear portion 88 of the stopper body 83, causing it to distend or bulge, as shown at 100 in FIG. 5.

Figure 6:
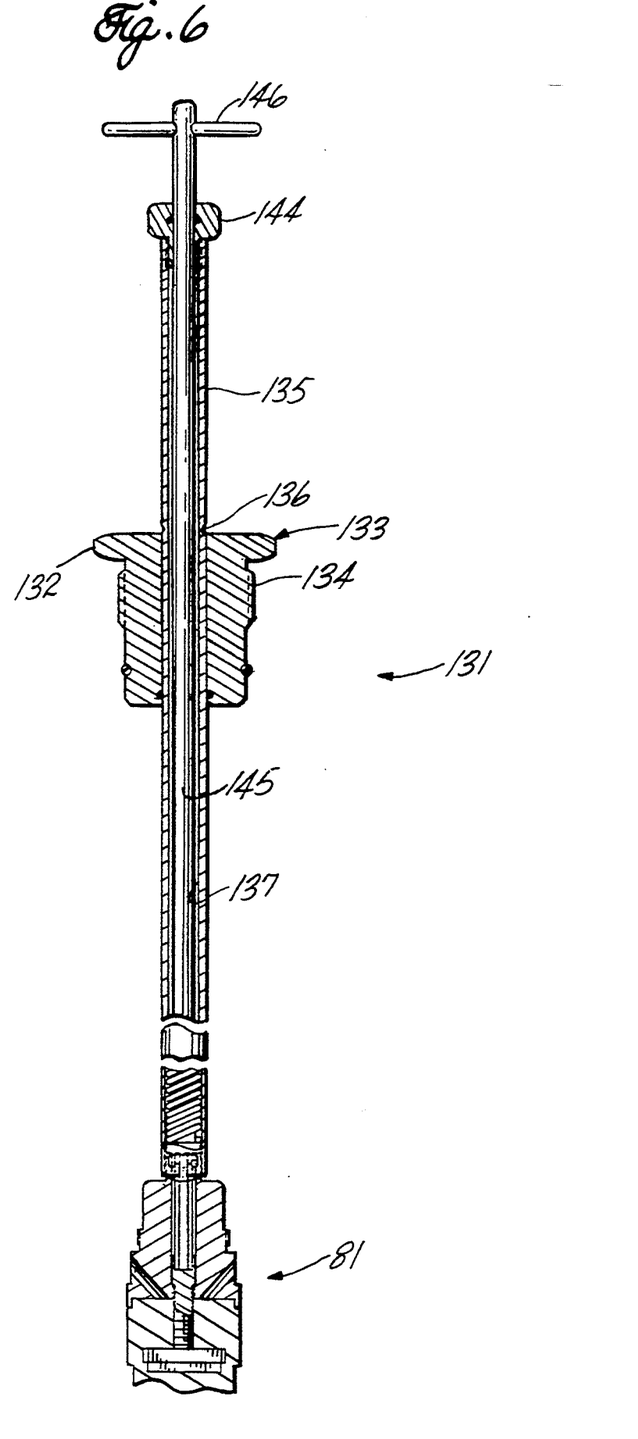
FIG. 6 is a cross-section through an insertion assembly for lowering the stopper of FIG. 4 through the gate valve assembly into the housing.
Figure 7:
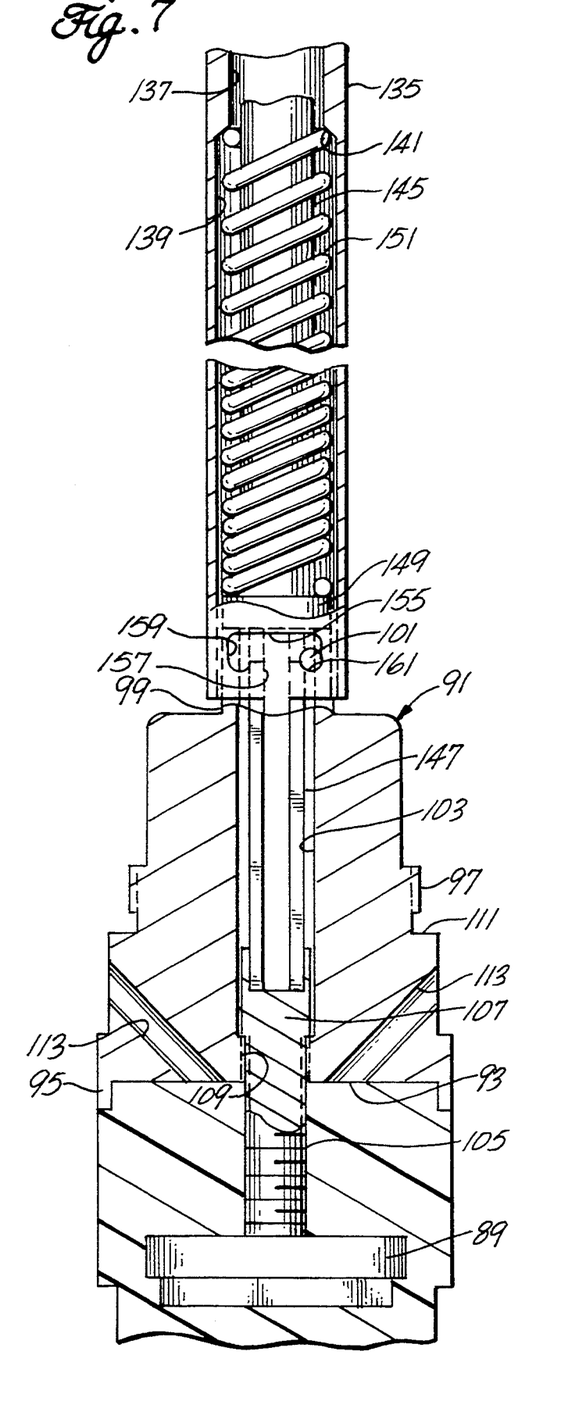
FIG. 7 is an enlargement of a portion of FIG. 6, illustrating the intercoupling of the distal end of the insertion tool and the rear portion of the stopper.

A tool 131 for inserting the stopper 81 through the gate valve assembly 53 into the housing 21 of FIG. 3 is illustrated in FIGS. 6 and 7. The tool 131 is adapted from the tool 800 of the above referenced Application, Ser. No. 07/513,599, described therein with reference to FIGS. 18-22. It includes a lead hub 133, having an hexagonal head 132 and a body, carrying threads 134. A tube 135 extends through the lead hub 133, the tube being grooved at 136 to designate a predetermined position of the tube within the lead hub 133. The tube 135 has a principal bore 137 extending from its proximal end toward its distal end, where it transitions into an enlarged end bore 139 (FIG. 7), the transition being marked by a shoulder 141. A jam nut 144, with a hexagonal head and an externally threaded body, is screwed into the internally threaded proximal end of the tube 135. The tube 135 terminates in a cutout 155, having a pair of opposed arcuate recesses 155 and 161, and an entry slot. 157 positioned midway between the two recesses. Extending through the axial bore of the jam nut 144 is a shaft 145, having at its proximal end a handle 146 and terminating at its distal end (FIG. 7) in a hexagonally-shaped wrench member 147, which extends from a retaining shoulder 149 at the end of the shaft 145. Compressed between the shoulders 141 and 149 of the tube 135 and the shaft 145, respectively, is a coiled spring 151. With the exception of the manner in which the shaft 135 is configured, the insertion tool 131 is essentially identical to the corresponding insertion tool 800 in the last referenced patent application. Thus, the lead hub 133, tube 135, jam nut 144, shaft 145 (with the exception of its distal end), and spring 151 may be identically configured to the corresponding components of the above referenced patent application, and that application may be consulted for details not treated further herein.

To install the stopper 81, it is snapped into place by inserting its cylindrical, reduced end 99 so that the pin 101 on that end enters the cutout 155 through the entry slot 157. While the stopper 81 is pressed against the spring 151 so as to slightly compress it, it is twisted slightly until the pin 101 enters one of the recesses 159, 161. Lowering of the insertion assembly 131 with the stopper 81 on its end may now begin. The process is identical to that used and described in the referenced patent application, Ser. No. 07/513,599, to insert its stopper assembly through its gate valve assembly. Briefly, with the tube 135 retracted within the lead hub 133, the insertion assembly 131 is installed in the gate valve assembly 53 and, more particularly, its lead hub 133 is screwed into the tool receptacle 71 of that assembly. The valve 57 is then opened and the tube 135 with the stopper 81 on its end is lowered through the passages 65 and 69 into the housing 21 until it reaches its desired position illustrated in FIG. 8. This position is indicated by alignment of the position marking groove 136, with the top of the lead hub 133.

Figure 8:
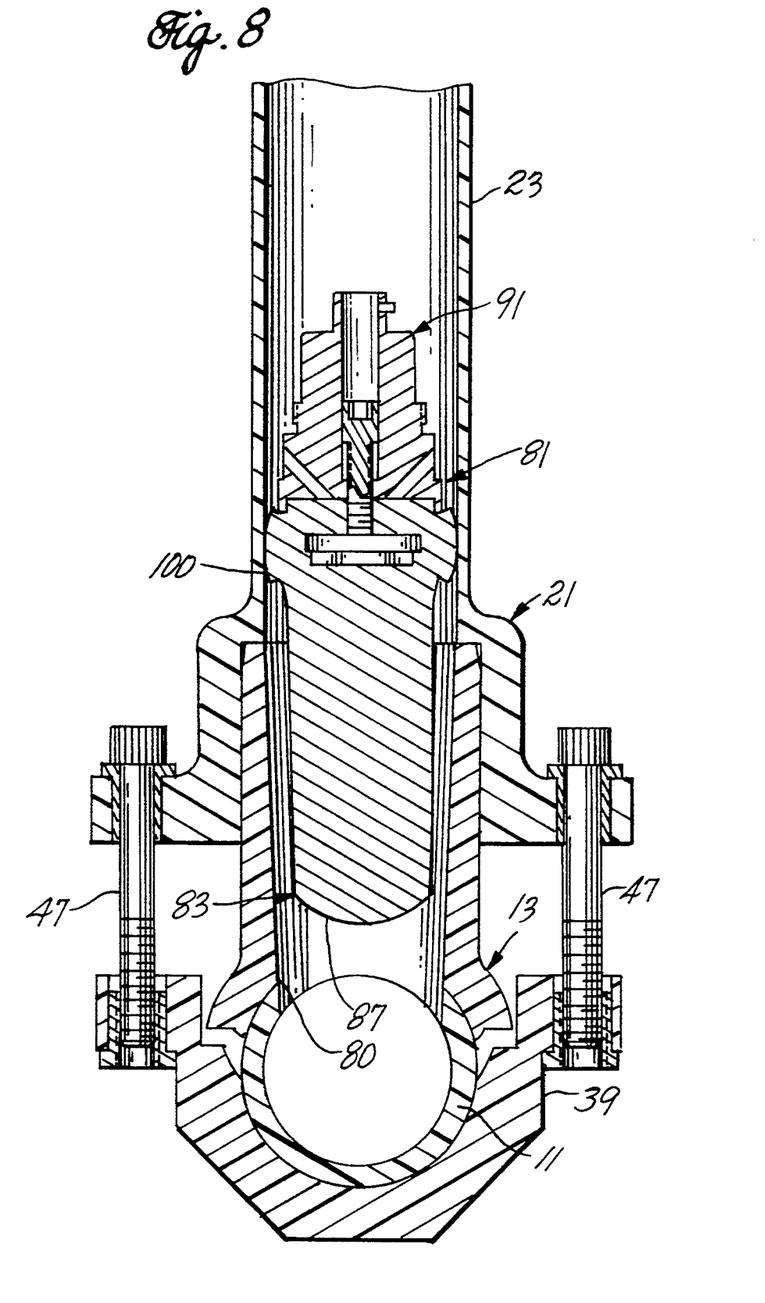
FIG. 8 is a cross-section through the pipe, housing, branching saddle and cradle of FIG. 2, after a hole has been bored through the wall of the pipe and the stopper of FIG. 4 has been installed in the housing.

With the stopper 81 properly positioned as shown in FIG. 8, the shaft 145 may be turned by means of its handle 146 inside the tube 135 in a direction to cause the bolt 105 to be withdrawn into the backing member 91 (which is kept from turning by the location of its pin 101 in the cutout 155) and, more particularly, into its axial bore 103. This causes the plate 89 to travel toward the backing member 91, compressing the rear portion 88 of the body 83 between the plate 89 and the hub's end face 93. As a result, the portion 88 is compressed and bulges radially until it blocks the bore 29 of the housing 21. This is called the "second position" in the following claims. With the housing so blocked, the insertion tool 131 may be removed through the gate valve assembly 53. This is accomplished by opening the valve 57, retracting the tube 135 until the entire insertion assembly is above the valve 57, closing the valve 57, opening the valve 75 to release pressure and then unscrewing the lead hub 133 from the tool receptacle 71 and removing the insertion assembly 131 entirely. Thereafter, the gate valve assembly 53 itself may be removed by unbolting it from the top of the housing 23, since the housing 21 is now blocked by the stopper 81.

Figure 10:
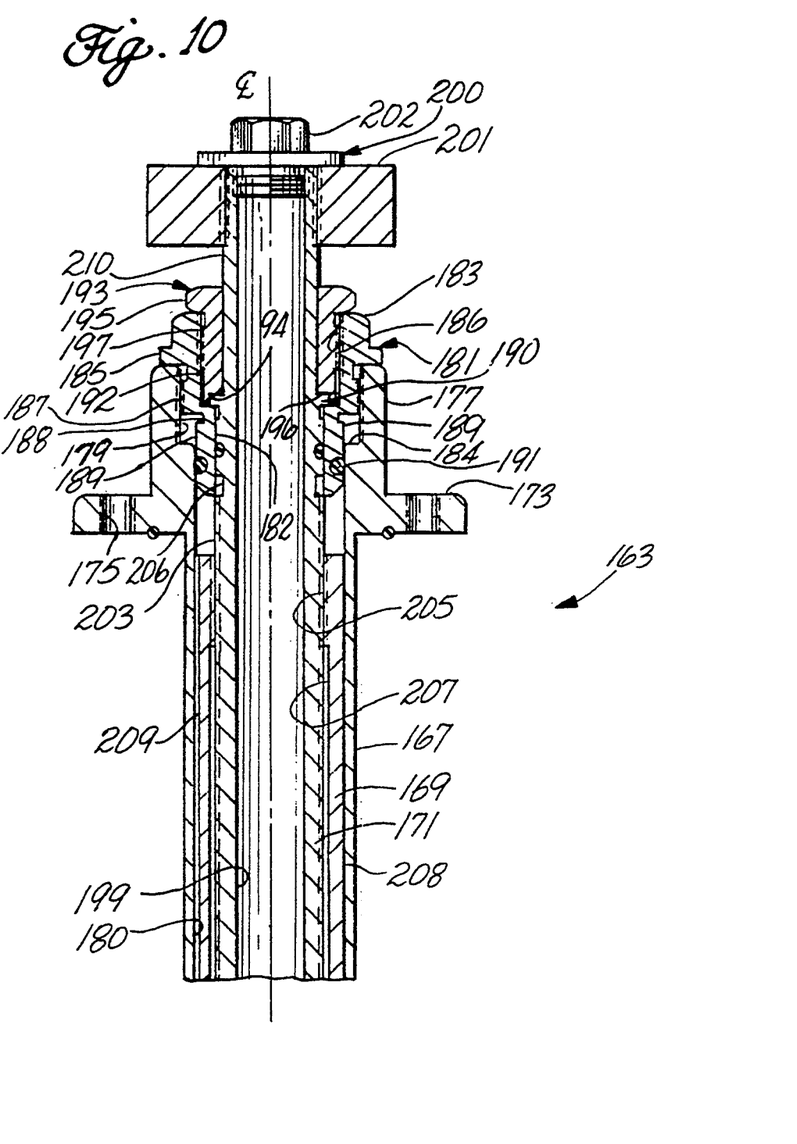
FIG. 10 is an enlarged view of the proximal end of the driving assembly of FIG. 9, in cross-section.
Figure 11:
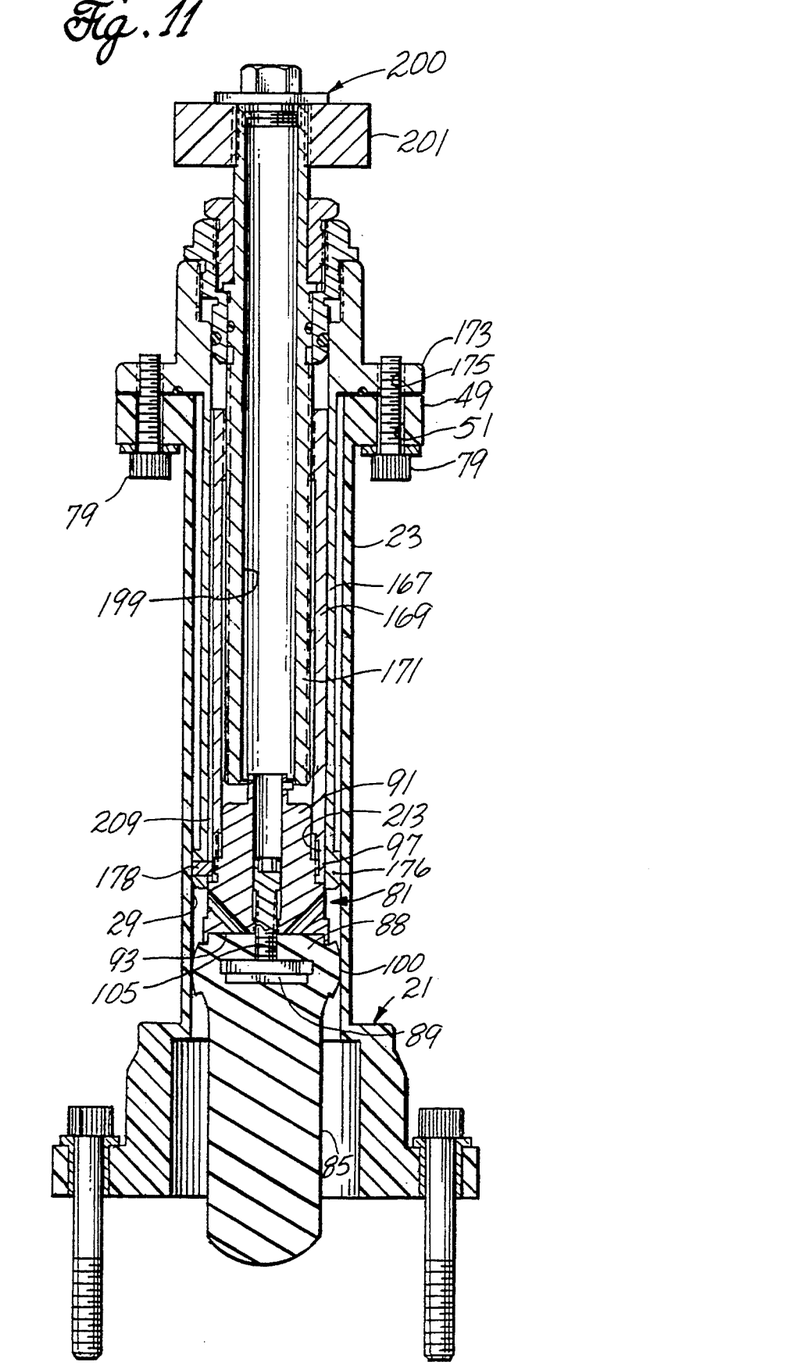
FIG. 11 is a cross-section through the housing of FIGS. 1–3, with the stopper driving assembly in place in the housing and in engagement with the rear end of the stopper.

The next step in the process is to install the stopper driving assembly 163, shown in FIGS. 10 and 11, into the housing 21, so as to engage the stopper 81, as shown in FIG. 11. The stopper driving assembly 163 comprises a cartridge made up of three telescoped tubular sections 167, 169 and 171. The first tubular section, the sheath 167, has a mounting flange 173 near its proximal end in which are distributed a set of threaded mounting holes 175. Extending from the flange 173 is a tubular hub 177, having an internally threaded inlet 179. The inlet 179 merges into the smooth bore 180 of the sheath 167.

The sheath 167 terminates in an integral raised rim 176, whose diameter is sized to fit snugly within the bore 29 of the housing 21, so as to center the cartridge 163 therein. A pin 178 is anchored in the rim 176 and protrudes slightly into the bore 180. Its purpose is to restrain the second tubular section, the collar 169, against rotation within the sheath 167, as will be described.

Threaded into the hub 177, at the head of the sheath 167, is a nut 181, having a hexagonal head 183, terminating in a flange 185. Extending distally from the flange 185 is a threaded section 187, terminating in a groove 188, from which there extends a smooth tubular portion 189 of reduced diameter. An O-ring seal 191 resides in a groove in the portion 189. Inside the smooth portion 189 is a smooth bore 182, which forms a shoulder 184, where the smooth bore 182 meets the internally threaded portion 186. The nut 181 is threaded into hub 177 until the flange 185 abuts against the end of the hub.

Located within the nut 181 is a jam nut 193. It includes a hexagonal head 195 from which extends an externally threaded, tubular section 197, by which the jam nut 193 is screwed into the nut 181. Extending distally from the threaded section 197 is a smooth tubular section 192, having a counter-bore 194, terminating in an annular shoulder 196.

With the jam nut 193 screwed into place in the nut 181, an annular locating space is created by the facing annular shoulders 184 and 196 of the nuts 181 and 193, respectively. As will be seen, that space serves to restrain the third tubular member, the drive shaft 171, against axial movement relative to the sheath 167, and hence, relative to the housing 21.

The drive shaft 171 has a smooth bore 199, which is threaded at its proximal end to receive a cap 200, having a hexagonal head 202. The drive shaft 171 is also threaded externally, and a square nut 201 is screwed onto that threaded end and serves subsequently to turn the drive shaft 171. A collar 190 extends around the drive shaft 171 into the space formed by the shoulders 184 and 196, and a sealing O-ring 204 resides in a groove, spaced below the collar. Spaced slightly distally from the O-ring 204 is a smooth, recessed peripheral region 206. The remainder of the drive shaft 171, from the recessed peripheral region 206 to the distal end of the drive shaft 171, carries an external thread 203. Between its locating collar 190 and its threaded proximal end, the drive shaft 171 has a smooth exterior portion 210.

Threadably supported on the drive shaft 171 is the third tubular member, collar 169. It is provided with a smooth external surface 208, in which is cut an axially extending slot 209, which runs the entire length of the collar 169, as indicated by the space shown to exist in FIG. 10, between the sheath 167 and the collar 169, to the left of the center line. The collar 169 has a smooth bore 207, terminating at the proximal end of collar 169 in a threaded portion of reduced diameter 205 and in a second threaded portion 213, at the distal end of the collar 169. The threads in the portion 205 mesh with the threads 203 on the drive shaft 171, while the threads 213 are adapted to engage the threads 97 of the stopper backing member 91.

The stopper driving assembly 163 is assembled in the following manner:

The jam nut 193 is slipped onto the smooth portion 210 of the drive shaft 171, after which the nut 201 is screwed onto the threaded proximal end of the drive shaft and tightened. The nut 181 is slipped onto the drive shaft 171 at its distal end and is threaded onto the jam nut 193, causing the drive shaft 171 to be captured with its locating collar 190 between the annular shoulders 184 and 196 of the nuts 181 and 193. With the parts thus far assembled, the drive shaft 171 is rotatable within the nuts 181 and 193.

The collar 169 may now be threaded onto the drive shaft 171, until it reaches a position substantially as shown in FIG. 10. The parts thus far assembled may now be inserted in the sheath 167, care being taken to align the axially extending slot 209 of the collar 169 with the radially inwardly extending pin 178 anchored in the sheath 167. With the collar 169 thus inserted into the sheath 167, the nut 181 may be screwed into the hub 177 and tightened. The assembly of the cartridge 163 is now complete. The collar 169 may be caused to travel axially between the sheath 167 and the drive shaft 171 by turning the drive shaft 171 within the sheath 167 by means of the nut 201.

Figure 9:
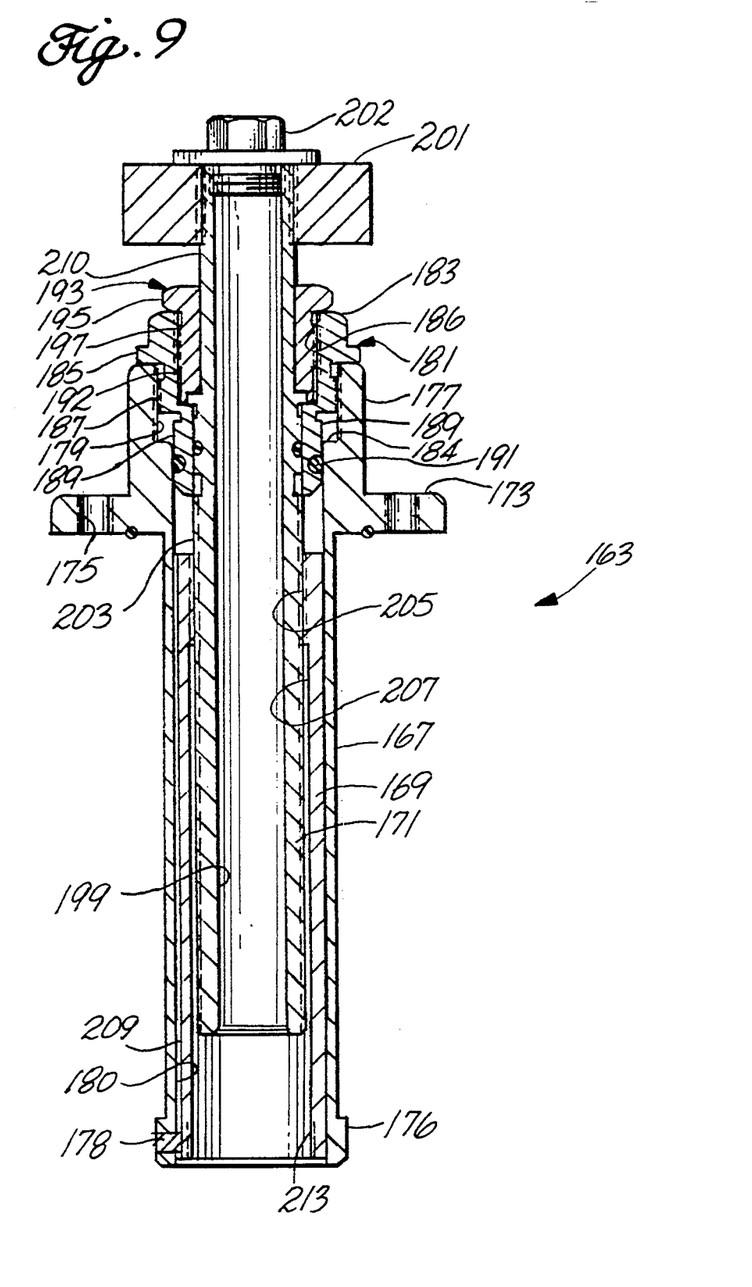
FIG. 9 is a cross-section through a stopper driving assembly, whereby the stopper may be moved axially within the housing.

The assembled cartridge 163 may now be installed on the housing 21 and extended in engagement with the stopper 81. Referring to FIGS. 8, 9 and 11, the cartridge 163 is lowered into housing 21 so that the flange 173 of the sheath 167 rests against the flange 49 of the housing 21. The hub 177 is then rotated through several turns, causing the collar 169 to turn with it because of the engagement of the locating pin 178 at the base of the sheath 167, with the axially extending slot 209 in the sleeve 169. Turning of the collar 169 causes it to be threaded onto the threaded portion 97 of the stopper backing member 91, as shown in FIG. 11. The stopper 81 is kept from being turned by the collar 169, as the latter is threaded onto it, by the frictional engagement between the stopper's bulging rear exterior surface 100 and the housing wall defining the bore 29.

When the collar 169 is threaded fully onto the backing member 91, the flange 173 of the sheath 167 is turned sufficiently to line up its bolt holes 175 with the bolt holes 51 in the flange 49 and the set of bolts 79 is tightened, clamping the sheath 167 to the housing 21 in the position shown in FIG. 11. With the sheath thus installed, a gas-tight space is created inside the housing 21, permitting the stopper 81 to be relaxed by releasing the pressure exerted on its rear region 88 by the plate 89 and the backing member 91. This may be accomplished by inserting a wrench through the bore 199 of the drive shaft 171. A wrench suitable for that purpose may comprise the wrench of FIG. 6, formed of the shaft 145, hexagonal cross-section 147 and handle 146. With the hexagonal section 146 inserted into the head 107 of the bolt 105, the bolt may be turned so as to drive its head toward the end face 93 of the backing member 91, causing the plate 89 to move axially away from the end face 93 so as to allow the body portion 88 to resume its relaxed state, illustrated in FIG. 4. This is desirable because it permits the stopper 81 to be left in place for long periods of time, without causing deterioration of the stopper body 83, due to fatigue. The wrench may then be removed and the cap 200 may be installed to prevent contaminants from entering the drive shaft 171.

The stopper 81 and the cartridge 163 may be left in place until some future time when it is necessary to actuate the stopper 81 so as to block the flow of gas in the pipe 11. At that time, the nut 201 may be turned, causing the drive shaft 171 to turn with it, causing the collar 169 to be translated axially toward the pipe 11 until the distal end 87 of the stopper body 83 abuts against the wall of the pipe opposite the opening 80 therein. Continued rotation of the drive shaft causes axial compression of the stopper body 83 until it is sufficiently deformed to assume the contour of the bore 12 of the pipe 11, thereby blocking the pipe. This is called the "first position" in the following claims. The pipe may be unblocked simply by reversing the process and turning the nut 201 in the opposite direction. The process may be repeated as many times as necessary until, either due to a preset schedule or the perceived deterioration of the stopper 81 due to age, it is desired to replace the stopper or the cartridge 163, or both, or, at least to inspect them. This can be readily accomplished essentially by reversing the process described thus far for installing the stopper 81 and the cartridge 163. Thus, with the stopper 81 in the position shown in FIG. 11, its rear portion 88 is expanded by means of the wrench inserted through the bore of the drive shaft 171 and turning the bolt 105. With the stopper rear end 88 thus expanded, the cartridge 163 may be removed and inspected, repaired or replaced, as necessary. If it is desired to remove the stopper 81, as well, the gate valve assembly 53 is reinstalled upon the housing 21, as shown in FIG. 3, and the stopper 81 may then be removed by use of the insertion tool 131.

There has been described a stopper which is capable of performing a dual purpose: blocking the flow of gas in a pipe and preventing the escape of gas from the pipe through an opening in the wall of the pipe and through a branch which is attached to the pipe, in line with the opening. Moreover, there has been described a driving assembly for the stopper, in the form of a cartridge, which permits the stopper both to be actuated so as to block the flow of gas in the pipe and also to be actuated so as to prevent the escape of gas through the wall of the pipe and through the branch in line with that opening in which branch stopper assembly is located. By virtue of the unique construction of the stopper, the cartridge may be removed for inspection, repair or replacement, without requiring the use of a gate valve assembly to pressurize the housing to which the cartridge is bolted and in which the stopper is anchored.

What is claimed is:

1. In combination with a pipe and a branch extending transversely from the pipe, a stopper for alternately blocking the pipe and the branch comprising:
    (a) a cylindrical deformable resilient body having a distal region movable between the pipe and the branch and a rear region movable within the branch;
    (b) means for moving the body between a first position and a second position;
    (c) means in the first position for compressing the distal region to block the pipe and relaxing the rear region to unblock the branch; and
    (d) means in the second position for compressing the rear region to block the branch and relaxing the distal region to unblock the pipe.

2. The combination of claim 1, in which the moving means comprises a drive shaft aligned with the cylindrical axis of the body and means for attaching the drive shaft to the rear region.

3. The combination of claim 2, in which the distal region of the body has a curved contour that matches the pipe.

4. The combination of claim 2, in which the attaching means for attaching comprises first and second clamps extending transversely to the cylindrical axis, the first clamp being embedded in the body and the second clamp abutting the end of the body so the rear region is disposed between the clamps, the second clamp being fixed relative to the drive shaft and the first clamp being movably relative to the drive shaft.

5. The combination of claim 4, in which the means in the first position comprises means for moving the drive shaft toward the pipe and means for moving the first clamp away from the second clamp.

6. The combination of claim 5, in which the means in the second position comprises means for moving the drive shaft away from the pipe and means for moving the first clamp toward the second clamp.

7. A method for alternating blocking a pipe and a branch extending transversely from the pipe, the method comprising the steps of:
    (a) moving a cylindrical deformable resilient body between a first position and a second position, the resilient body having a distal region movable between the pipe and the branch and a rear region movable within the branch;
    (b) compressing the distal region to block the pipe and relaxing the rear region to unblock the branch in the first position; and
    (c) compressing the rear region to block the branch and relaxing the distal region to unblock the pipe in the second position.

* * * * *